UNITED STATES PATENT OFFICE.

OSCAR F. BOOMER AND HENRY R. RANDALL, OF BROOKLYN, NEW YORK.

IMPROVEMENT IN THE MANUFACTURE OF MALT SIRUPS OR EXTRACTS.

Specification forming part of Letters Patent No. 187,250, dated February 13, 1877; application filed October 4, 1876.

*To all whom it may concern:*

Be it known that we, OSCAR F. BOOMER and HENRY R. RANDALL, both of Brooklyn, in the county of Kings and State of New York, have invented certain Improvements in the Manufacture of Malt Sirup or Extract, of which the following is a specification:

This invention relates to the manufacture of the solution of glucose dextrine, &c., used in brewing and distilling, and commonly known as malt sirup and malt extract; and the object of the present invention is to secure a much larger yield or product of such sirup or extract from a given quantity of grain or other starch-bearing substance than has been possible by the methods hitherto most approved.

In order to fully comprehend the nature of our invention, it is necessary to bear in mind that in all grain and most other starch-bearing substances the starch globules are covered or encysted by a peculiar fatty acid, which, in the ordinary mashing process, prevents the full action of the diastase upon the starch, and, in the same ratio that this full action is prevented, diminishes the yield or product of sirup or extract.

Our invention comprises, in the manufacture of malt sirup or extract, the treatment of the grain or other starch-bearing substance, ground or reduced to a suitable degree of fineness in an alkaline solution, which, by neutralizing the fatty acid hereinbefore referred to, liberates the starch and exposes the same to the full and complete action of the diastase in the subsequent malting or mashing process.

Our invention also comprises the extraction of the sirup or extract from the grain or starch-bearing substance after the same has undergone the mashing process to pressure in bags, cloths, or any suitable fabric, whereby the sirup or extract is obtained clear and free from extraneous matter, and whereby the entire quantity produced from the grain or other starch-bearing material is eliminated from the refuse and collected either for use in its dilute condition or for concentration, by evaporation, for shipment or other purposes.

In carrying our invention into practice we reduce the grain or other starch-bearing substance, by grinding or any other appropriate means, to a fineness or degree of comminution equal, say, to the ordinary fineness of Indian meal, although this, within certain limits, may be varied. We provide in a suitable receptacle—as, for example, an ordinary mash-tub—a solution of alkali in water, preferably carbonate of potash, in the proportion of one ounce of the carbonate of potash in forty-five gallons of water. It is to be understood, however, that any alkali or alkaline material that will neutralize, dissolve, or destroy the fatty acid inclosing the starch-globules, as hereinbefore specified, will answer the purpose, and that the strength of the solution may be varied within wide limits without affecting the principle of our invention, the quantity of alkaline material to a given quantity of water depending somewhat upon the character of the starch-bearing material, but more upon the character of the alkali employed. This alkaline solution we heat to a temperature of, say, 180°; but this temperature may also be varied—that is to say, be made greater or less—as may be preferred, the rapidity with which our process is carried into effect being greater as the heat increases and slower as the heat is diminished. The hereinbefore-described ground or comminuted grain or other starch-bearing substance is placed in this heated alkaline solution in the proportion of about one bushel of the ground grain, or an equivalent quantity of other starchy material, to forty-five gallons of the heated alkaline liquid. The liquid or semi-liquid mass is then kept agitated—as, for example, by the ordinary agitating mechanism of the ordinary mash—during a space of one hour, more or less; in other words, for a length of time sufficient for the alkali in the liquid to act upon, neutralize, and remove the fatty acid inclosing or encysting the starch globules or the grain or other starch-bearing substance. This done, the starch is wholly exposed to the action of the diastase of the malt subsequently added, and this malt may be added to the mass herein just described in any desired proportion, according to the degree of the malt flavor which it is desired to give to the malt sirup or extract. For ordinary purposes we may say the quantity of malt may be about fifteen per cent. by weight of the grain or other starch-bearing substance employed. Previous, however, to the addition of the malt the temperature of the mass should be reduced to any point between 165° and 140°, these limits being those dictated by experience as the best, although they may be exceeded either above or below the points indicated without changing the principle of our invention. The malt having been added, as just hereinbefore explained, the agitation of the mass is continued until the malt is thoroughly commingled with the ground grain or other starch-bearing product, thereby bringing, as nearly as is possible, the particles of the malt into immediate or mechanical contact with the particles of the starch. This done, the mash-tub or receptacle containing the mass is closed over to retain the heat therein. The agitation being discontinued, the same is then allowed to remain until the diastase has acted upon the starch to complete the transformation of the latter into dextrine and glucose; in other words, into a malt sirup or extract, so termed.

When this transformation is complete, the malt sirup or extract exists mixed with the refuse of the grain or other starch-bearing substance employed.

In order to effect the separation of the malt sirup or extract from this refuse, I place the same in bags, cloths, or fabric or material of any suitable kind, and these, inclosing the malt sirup or extract, we place in a press of any suitable construction—as, for example, a press operating on the principle of a cider-press—and subject the whole to pressure continued to such an extent as to express the liquid solution from the mass, leaving the refuse in the bags, cloths, or other fabric or material just hereinbefore referred to. This pressing serves a double purpose: It enables the liquid to be obtained strained clear from impurities, and also enables the entire quantity produced to be eliminated from the refuse in form capable of use.

In some cases, as, for instance, where the malt sirup or extract is to be used in the immediate neighborhood where manufactured, it may be used in the condition in which it comes from the press. In others, where said sirup or extract is to be transported to any distance, it may be concentrated by evaporation in vacuo or otherwise to any requisite degree—preferably to about 40° Baumé.

By the means hereinbefore described we increase the yield of malt sirup or extract capable of utilization from a given quantity of grain or other starch-bearing substance to nearly one hundred per cent. over and above what has hitherto been possible by any method of treating grain or starchy substance for use in brewing or distilling.

What we claim as our invention is—

1. In the manufacture of malt sirup or extract, the treatment of the grain or other starch-bearing substance, previously ground or mechanically reduced to a suitable degree of fineness with an alkaline solution, substantially as and for the purpose herein set forth.

2. The herein described process of producing commercial malt sirup or extract from starch-bearing substances by subjecting such substances to pressure in bags, cloths, or enwrapping material placed in a press, subsequent to and consequent upon the mashing of said substances, substantially as herein set forth.

OSCAR F. BOOMER.
HENRY R. RANDALL.

Witnesses:
EDWARD HOLLY,
H. WELLS, Jr.